US006837186B1

(12) United States Patent
Terao (10) Patent No.: US 6,837,186 B1
(45) Date of Patent: Jan. 4, 2005

(54) EXERCISE TREADMILL FOR DOGS

(76) Inventor: Kazuto Terao, 953 W. Nance St., Perris, CA (US) 92571-9743

( * ) Notice: Subject to any disclaimer, the term of this patent is extended or adjusted under 35 U.S.C. 154(b) by 0 days.

(21) Appl. No.: 10/464,033

(22) Filed: Jun. 17, 2003

(51) Int. Cl.[7] .............................................. A01D 15/00
(52) U.S. Cl. ............................ 119/700; 472/48; 185/3; 482/54; 119/702; 119/703; 119/701
(58) Field of Search ............................ 119/700, 702, 119/703, 701; 185/3; 472/48; 482/54

(56) References Cited

U.S. PATENT DOCUMENTS

| | | | | |
|---|---|---|---|---|
| 2,155,684 A | * | 4/1939 | Richards | 119/700 |
| 4,095,561 A | * | 6/1978 | Ruetenik | 119/700 |
| 4,205,628 A | * | 6/1980 | Null | 119/700 |
| 4,819,583 A | * | 4/1989 | Guerra | 119/700 |
| 5,100,127 A | * | 3/1992 | Melnick et al. | 119/700 |
| 5,277,150 A | * | 1/1994 | Rhodes | 119/700 |
| D347,912 S | * | 6/1994 | Golden et al. | D30/160 |
| 5,488,926 A | * | 2/1996 | Hunt | 119/756 |
| 6,058,888 A | * | 5/2000 | Nichols | 119/702 |
| 6,347,603 B1 | * | 2/2002 | Felger | 119/700 |
| 6,609,478 B2 | * | 8/2003 | Del Valle | 119/703 |

FOREIGN PATENT DOCUMENTS

GB  2132464 A  *  7/1984  .......... A01K/15/02

* cited by examiner

Primary Examiner—Michael J. Carone
Assistant Examiner—Andrea M. Valenti
(74) Attorney, Agent, or Firm—Michael I. Kroll (57) ABSTRACT

The present invention 10 discloses a computerized treadmill 24 for dogs or other animals 12 wherein the treadmill is enclosed within transparent structural walls 16 having a door 28 hingedly 30 attached thereto to allow the dog to enter and exit for exercise. An overhead adjustable bar 18 is included for attaching a lease 38 thereto. A control console 20 is provided to allow the user 22 to set the parameters for the dog's 12 exercise session.

9 Claims, 9 Drawing Sheets

EXERCISE TREADMILL FOR DOGS

DISCLOSURE DOCUMENT

This document is subject to Disclosure Document no. 522149, dated Nov. 25, 2002.

BACKGROUND OF THE INVENTION

1. Field of the Invention

The present invention relates generally to exercise devices for animals and, more specifically, to a computerized treadmill for dogs wherein the treadmill is enclosed within transparent structural walls having a door hingedly attached thereto to allow the dog to enter and exit for exercise. An overhead adjustable bar is included for attaching a leash thereto. A control console is provided to allow the user to set the parameters for the dogs exercise session

2. Description of the Prior Art

There are other exercise devices for animals. Typical of these is U.S. Pat. No. 5,277,150 issued to J. Rhodes on Jan. 11, 1994.

A patent was issued to R. L. Golden et al. on Jun. 14, 1994 as U.S. Pat. No. Des. 347,912. Yet another U.S. Pat. No. 6,347,603 was issued to H. V. Felger on Feb. 19, 2002.

U.S. Pat. No. 5,277,150

Inventor: John Rhodes

Issued: Jan. 11, 1994

An exercise assembly adapted to build endurance in dogs by allowing them to maintain a continuous running mode. A support frame serves to movably support a treadmill and a treadway mounted thereon wherein a plurality of independent, spaced apart roller assemblies support and allow the continuous linear movement of the closed configuration treadmill. The dog, running on the treadmill is prompted to continue his running motion by attempting to reach a bait animal maintained in a bait cage out of the reach of the dog being exercised.

U.S. Pat. No. Des. 347,912

Inventor: Rhonda L. Golden et al.

Issued: Jun. 14, 1994

The ornamental design for a dog treadmill, as shown and described.

U.S. Pat. No. 6,347,603

Inventor: H, Victor Felger

Issued: Feb. 19, 2002

Fegler disclosed an apparatus for use in exercising a dog or other animal on a treadmill. For some applications the apparatus may be releasably secured to the treadmill. For other applications the apparatus may be permanently attached to the treadmill. The apparatus preferably includes first and second generally U-shaped frame members with a pair of side members attached thereto and extending therebetween. One or more rings are provided as part of the apparatus for use in positioning the dog or other animal at a desired location on the treadmill. A system may also be provided for local and/or remote recording, monitoring and evaluation of exercises performed by the dog or other animal.

While these animal exercise devices may be suitable for the purposes for which they were designed, they would not be as suitable for the purposes of the present invention, as hereinafter described.

SUMMARY OF THE PRESENT INVENTION

The present invention discloses a computerized treadmill for dogs or other animals wherein the treadmill is enclosed within transparent structural walls having a door hingedly attached thereto to allow the dog to enter and exit for exercise. An overhead adjustable bar is included for attaching a lease thereto. A control console is provided to allow the user to set the parameters for the dog's exercise session.

A primary object of the present invention is to provide an exercise treadmill for dogs.

Another object of the present invention is to provide an exercise treadmill for dogs having a computerized control console to allow the user to customize the parameters for the dog's exercise session.

Still another object of the present invention is to provide an exercise treadmill for dogs including a transparent structure enclosing the sides thereof with an entry door.

Another object of the present invention is to provide an exercise treadmill for dogs that allows a dog to get proper exercise when the owner doesn't have the time, energy or space to allow the dog to run and play.

Yet another object of the present invention is to provide an exercise treadmill for dogs including an adjustable, overhead arm for attaching a leash to.

Still another of the present invention is to provide an exercise treadmill for dogs that is simple and easy to use.

Still yet another object of the present invention is to provide an exercise treadmill for dogs that is inexpensive to manufacture and operate.

Additional objects of the present invention will appear as the description proceeds.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.
10 present invention
12 dog
14 frame
16 side of frame
18 arm
20 control panel
22 owner user
24 treadmill
26 front of frame
28 door
30 hinge
32 latch
34 storage area
36 pin
38 leash
40 swivel ring
42 motor
44 power cord
46 ball bearing roller
48 cover
50 harness
52 conveyor belt
54 pulley
56 computer
58 wiring
60 outer sleeve
62 inner arm
64 apertures
66 aperture
68 snap hook
70 ventilation apertures

DETAILED DESCRIPTION OF THE PREFERRED EMBODIMENT

The following discussion describes in detail one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims.

Figure 1:
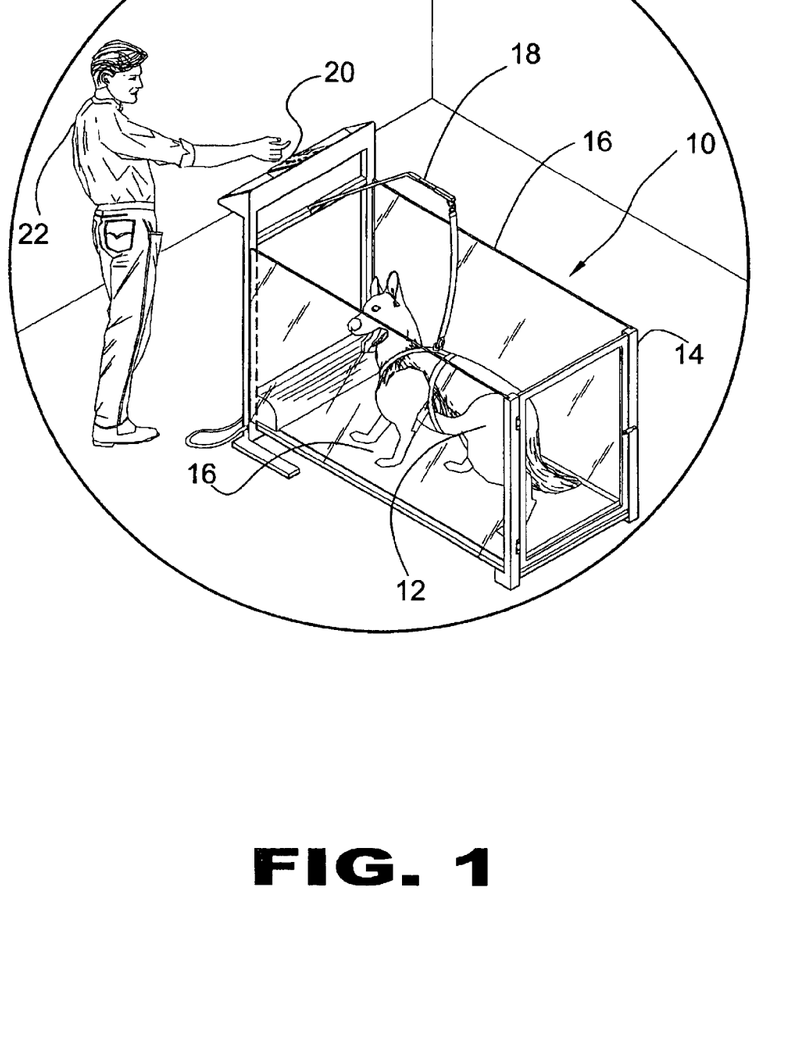
FIG. 1 is an illustrative view of the dog treadmill of the present invention in use.

Turning to FIG. 1, shown therein is an illustrative view of the dog treadmill of the present invention 10 in use. The present invention 10 discloses a treadmill apparatus for use in exercising a dog 12 having a frame member 14 with a pair of side members 16 or enclosures attached thereto and extending therebetween, an open front member, an entrance area opposing the front portion and having a door hingedly attached to the frame member with a latch member for securing the door in a closed position. An adjustable overhead arm 18 provides an attachment ring as part of the apparatus for use in positioning the dog 12 or other animal at a desired location on the treadmill. A computerized control panel 20 allows the dog's owner 22 to set parameters for the exercise session.

Figure 2:
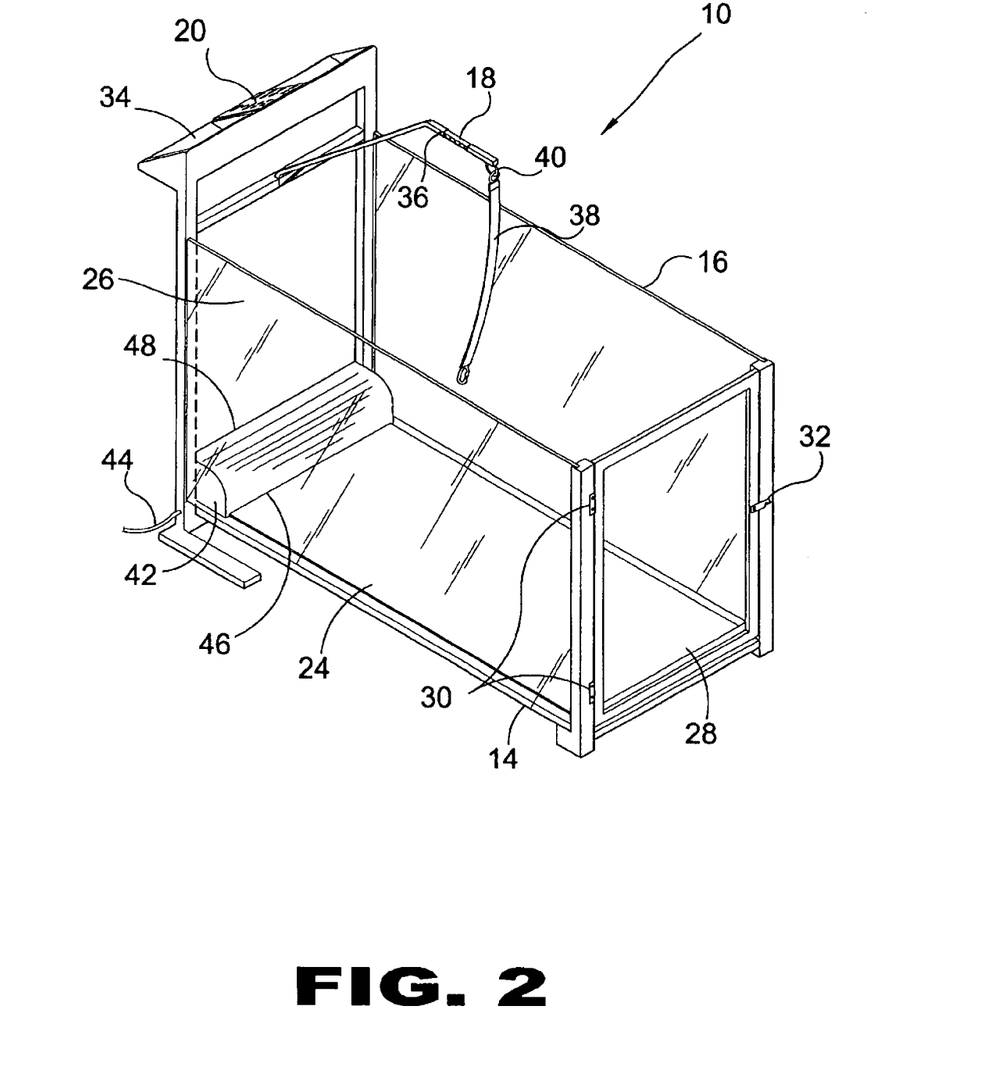
FIG. 2 is a perspective view of the dog treadmill of the present invention.

Turning to FIG. 2, shown therein is a perspective view of the dog treadmill 24 of the present invention 10. The present invention 10 discloses a treadmill 24 apparatus for use in exercising a dog having a frame member 14 with a pair of side members 16 or enclosures attached thereto and extending therebetween, an open front member 26 an entrance area opposing the front portion and having a door 26 hingedly 30 attached to the frame member with a latch 32 for securing the closure of the door. An adjustable overhead arm 18 with pin 36 provides means for positioning the dog at a desired location on the treadmill 24 using lash 38 with swivel ring 40. A computerized control panel 20 allows the dog's owner to set parameters for the exercise session. Storage area 34 is provided to the right and left side of the control panel 20 for the storage of the animal's exercising schedules. Treadmill 24 has an electrical 110–120 VAC motor 42, with power cord 44, ball bearing roller 46 and cover 48 for the motor and bearing.

Figure 3:
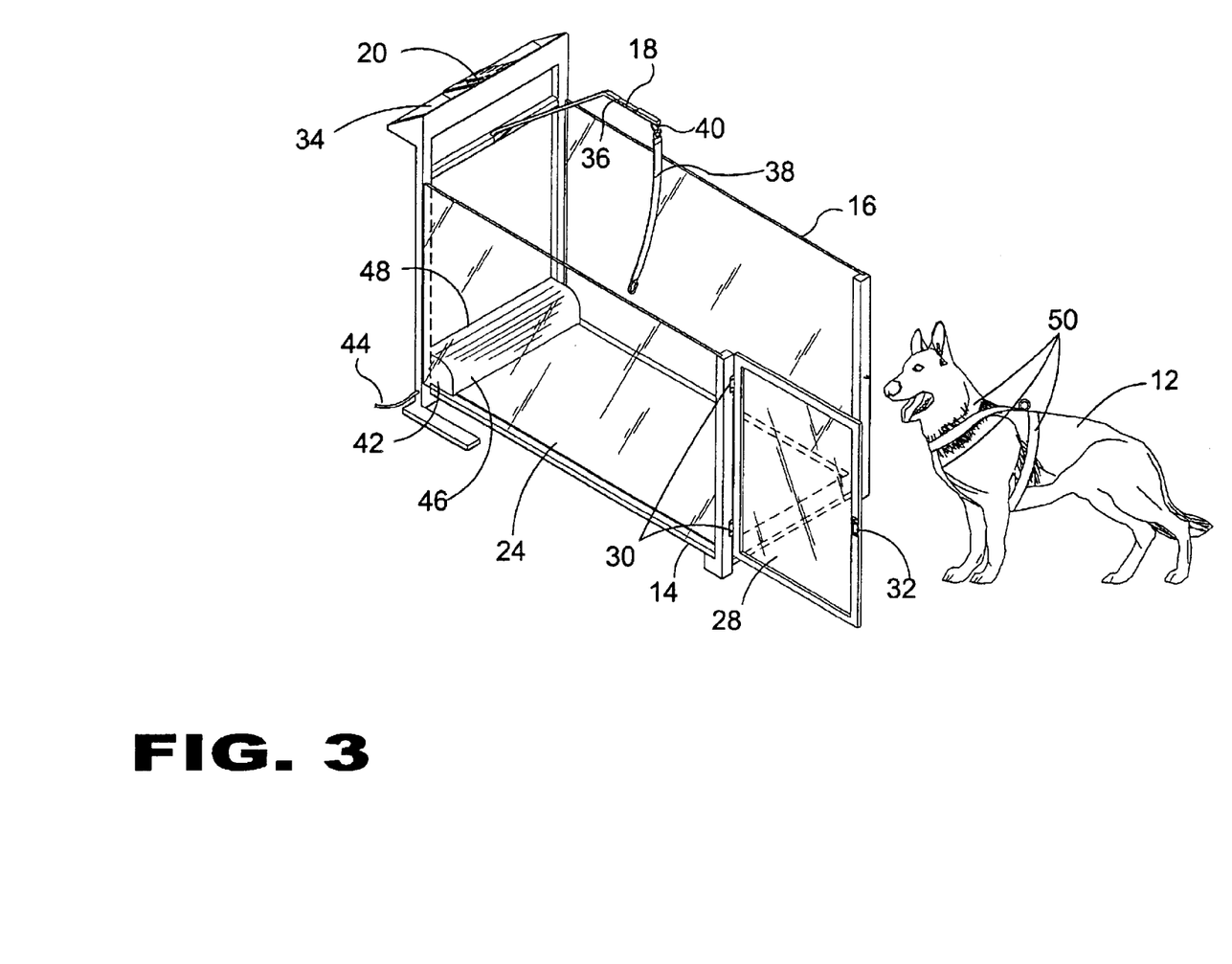
FIG. 3 is an illustrative view of the dog treadmill of the present invention in use.

Turning to FIG. 3, shown therein is an illustrative view of the dog treadmill of the present invention 10. The present invention 10 is a treadmill 24 apparatus for use in exercising a dog 12 having an overhead adjustable arm 18 providing an attachment ring 40 as part of the apparatus for use in positioning the dog at a desired location on the treadmill. A swivel ring 40 attaches a leash 38 to a harness 50 suited on the dog 12 prior to the activation of the treadmill 24. A computerized control 20 panel allows the dog's owner to set parameters for the exercise session. Other previously disclosed elements are also shown.

Figure 4:
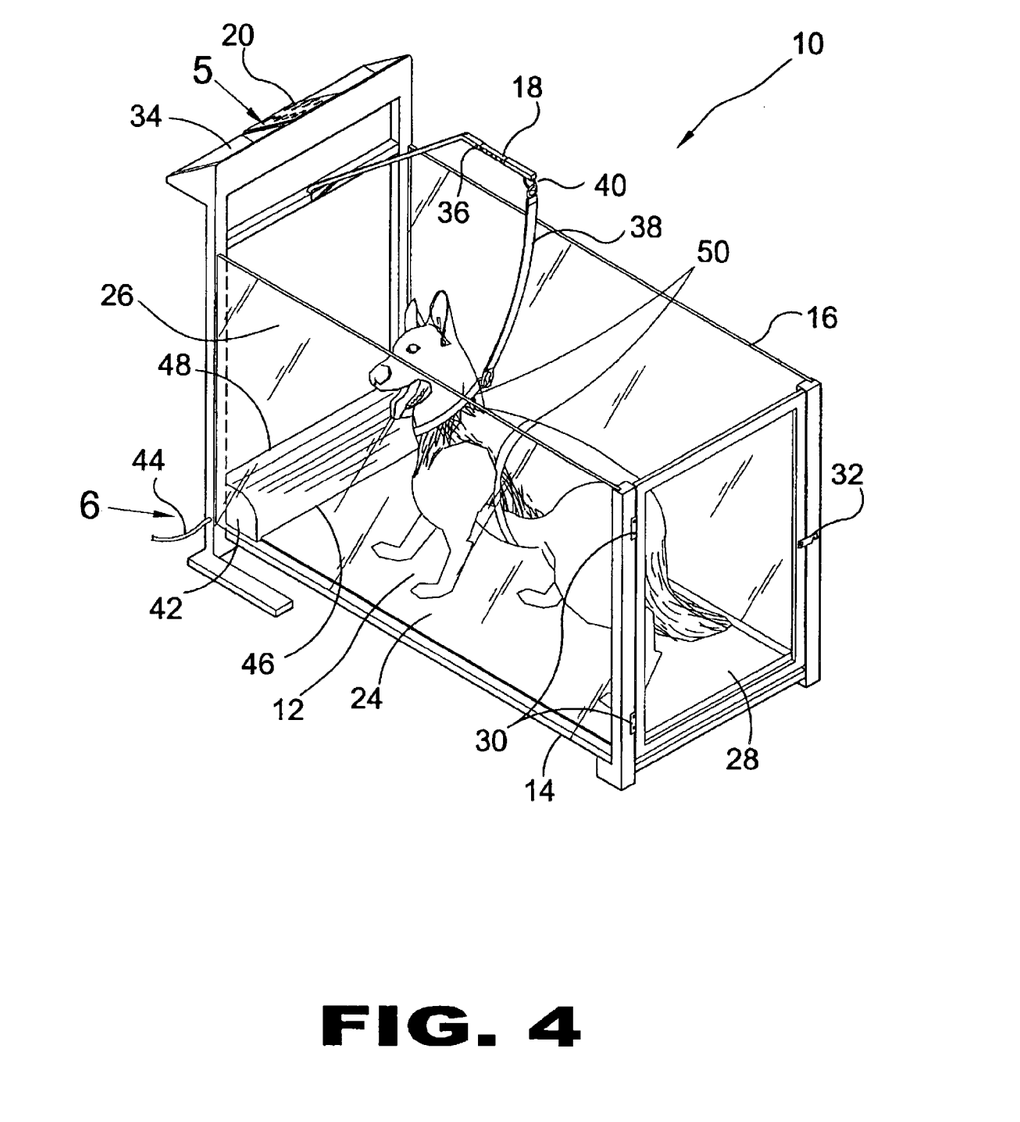
FIG. 4 is an illustrative view of the dog treadmill of the present invention in use.

Turning to FIG. 4, shown therein is an illustrative view of the dog treadmill of the present invention 10 in use. Shown is the present invention 10 being a treadmill 24 apparatus for use in exercising a dog 12 having a frame member 14 with a pair of side members 16 or enclosures attached thereto and extending therebetween, an open front member 26 an entrance area having a door 28 hingedly 30 attached to the frame member with a latch 32 to secure the door in a closed position. An adjustable overhead arm 18 provides an attachment ring 40 as part of the apparatus for use in positioning the dog 12 at a desired location on the treadmill 24. The dog 12 is suited with a harness 50 and attached by a leash 38 to the overhead arm 18 prior to the activation of the apparatus. A computerized control panel 20 allows the dog's owner to set parameters for the exercise session. Other previously disclosed elements are also shown.

Figure 5:
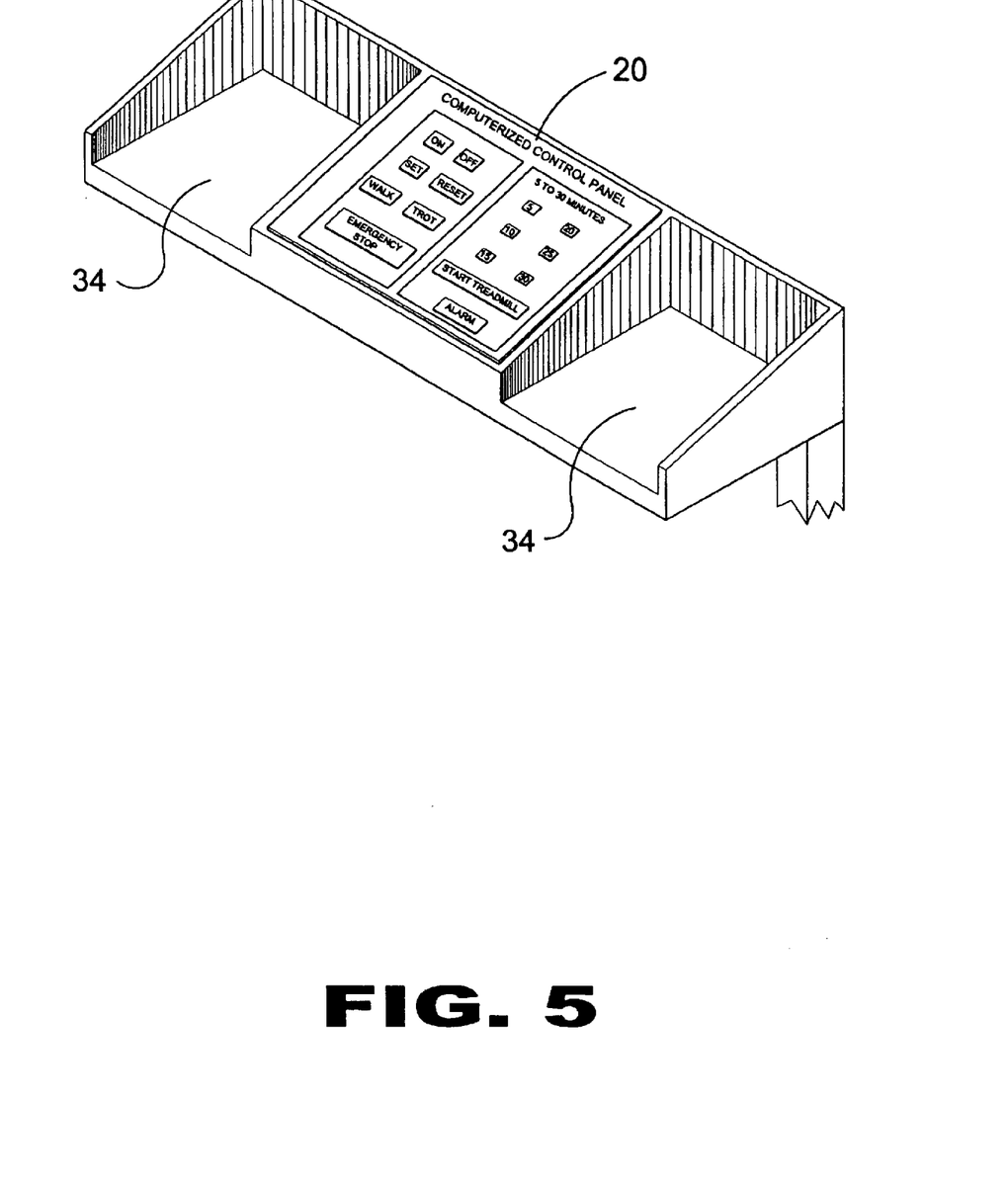
FIG. 5 is a detailed view of the computerized control panel of the present invention.

Turning to FIG. 5, shown therein is a detailed view of the computerized control panel 20 of the present invention. Shown is the control panel 20 of the present invention a computerized control panel that allows the dog's owner to set parameters for the exercise session. Storage areas 34 are also shown.

Figure 6:
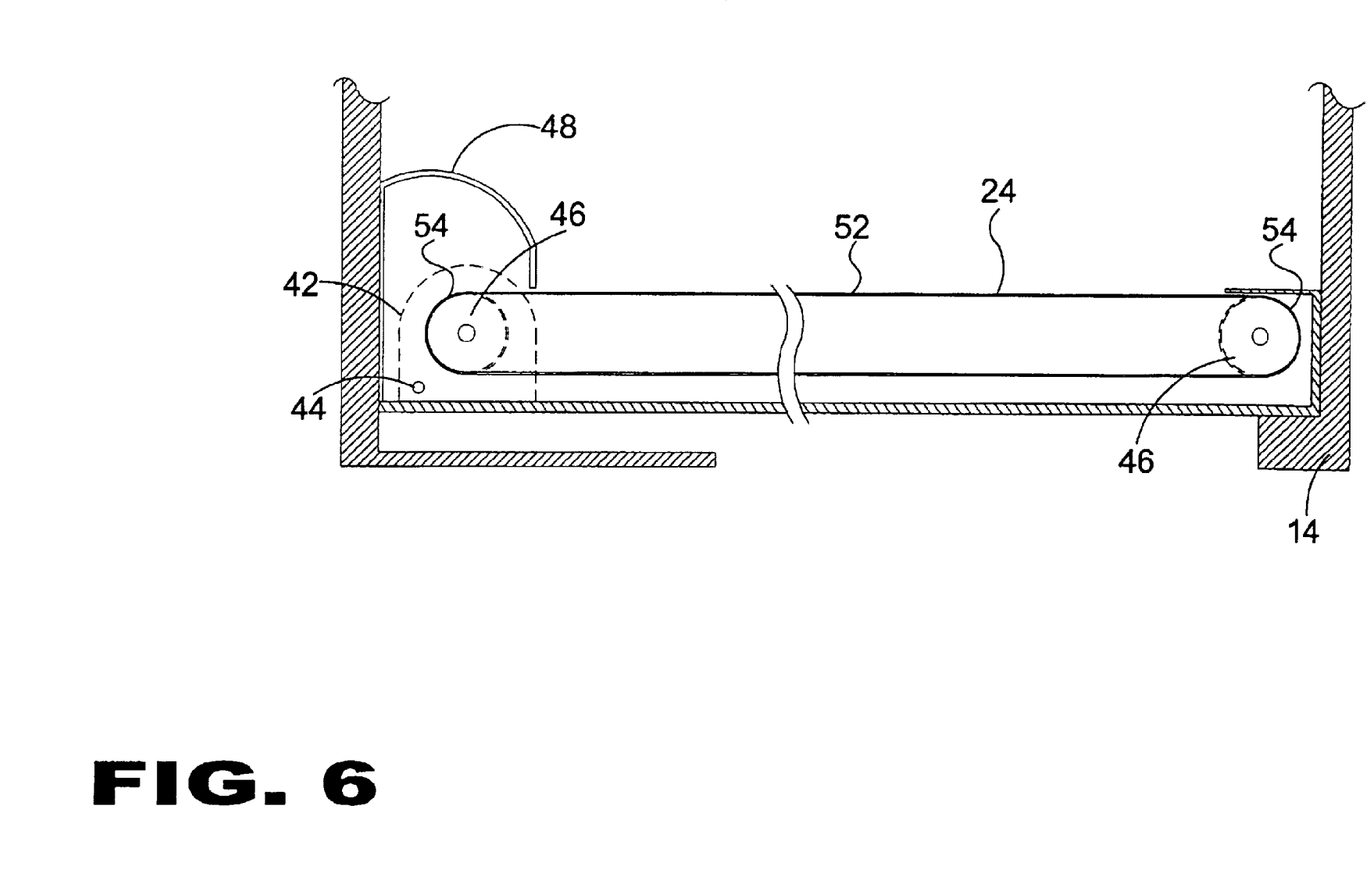
FIG. 6 is a sectional view of the dog treadmill of the present invention.

Turning to FIG. 6, shown therein is a sectional view of the dog treadmill 24 of the present invention. Shown is a sectional view of the present invention, having an electric 115 ac volt motor 42, pulley 54 and conveyer belt 52 and ball bearing rollers 46. A computerized control panel allows the dog's owner to set parameters for the exercise session. Also shown are the frame 14, cover 48 and power cord 44.

Figure 7:
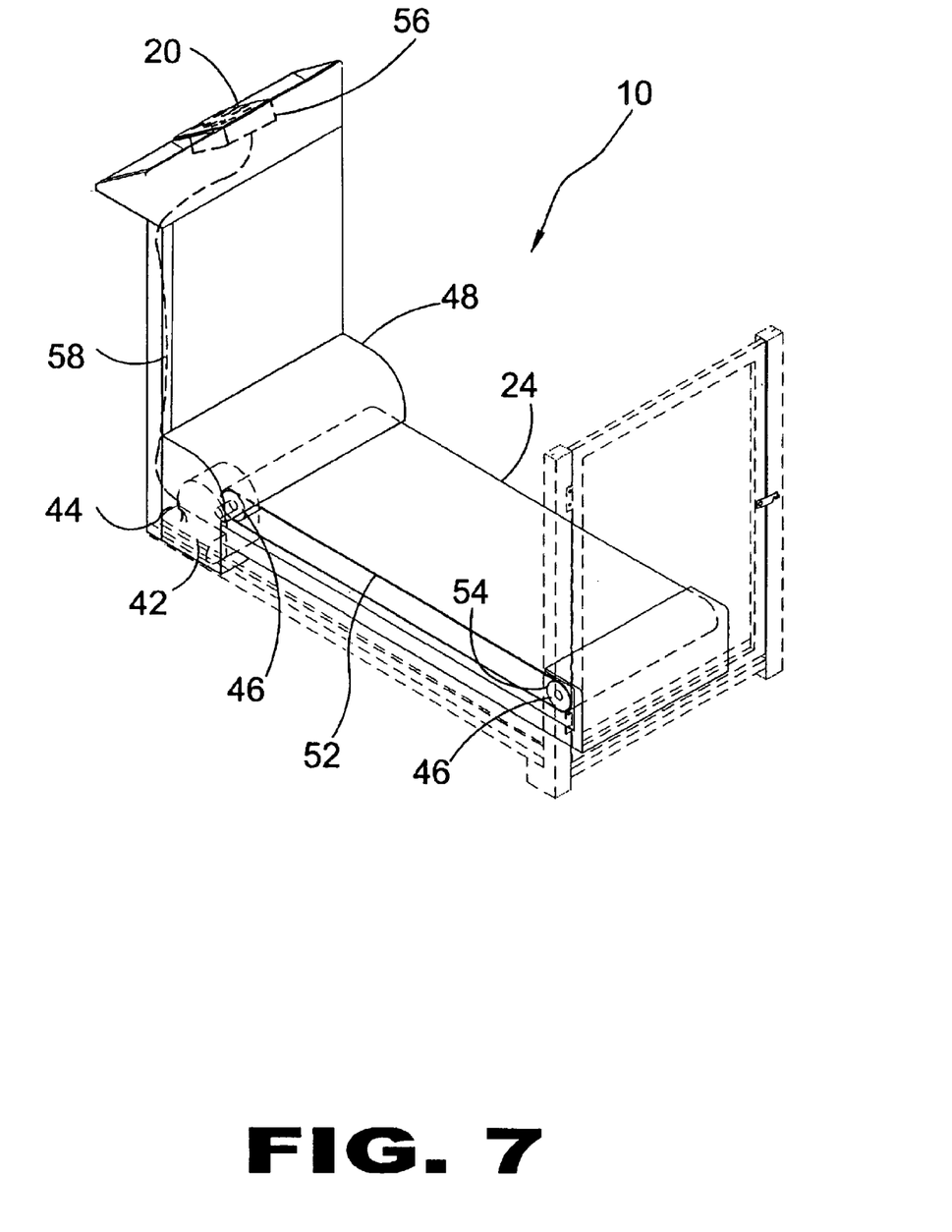
FIG. 7 is a perspective view of the dog treadmill of the present invention.

Turning to FIG. 7, shown therein is an illustrated view of the dog treadmill of the present invention 10. Shown is a view of the present invention 10 having an electric 115 AC volt motor 42, pulley 54 and conveyer belt or moving treadmill surface 52 and ball bearing rollers 46. A computerized control panel 20 with computer 56 therein with wiring 58 allows the dog's owner to set parameters for the exercise session. Other previously disclosed elements are also shown.

Figure 8:
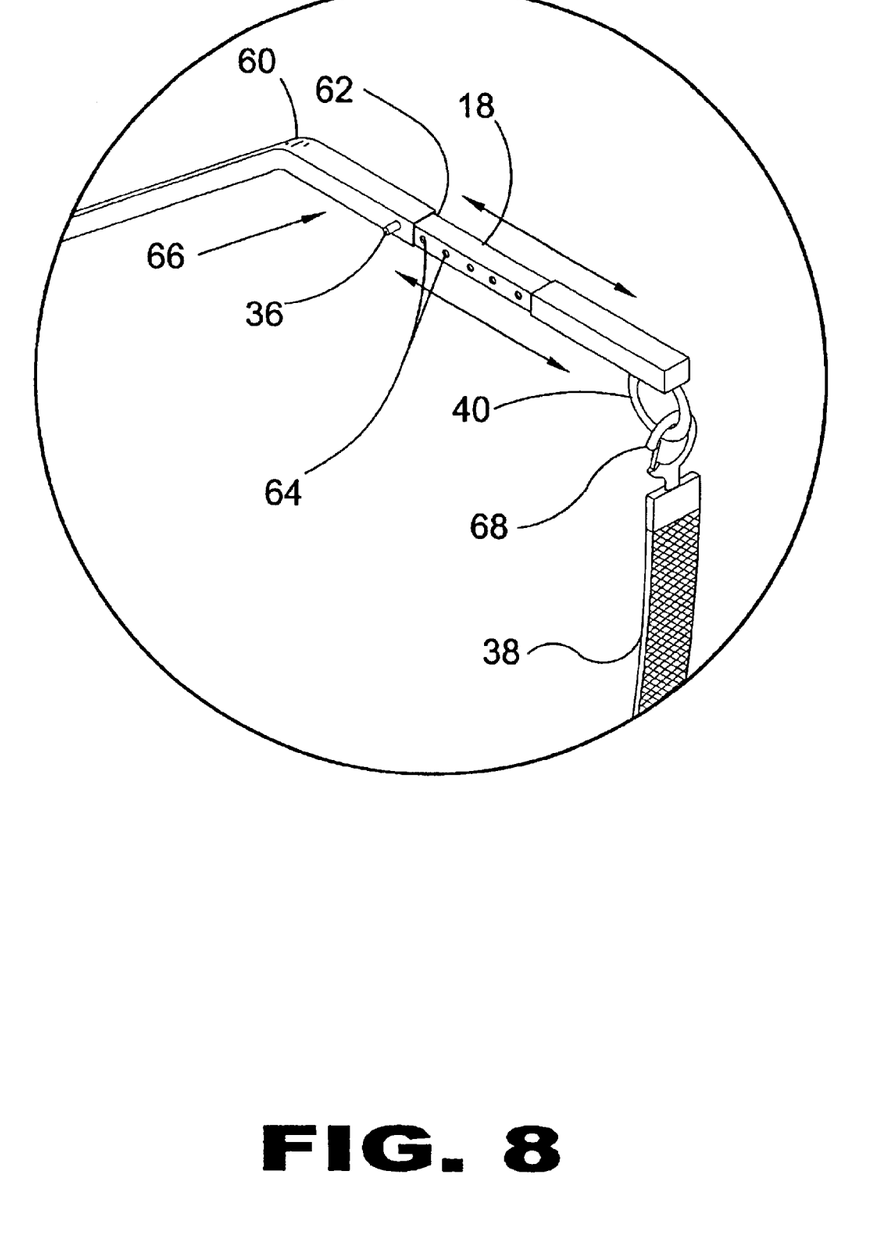
FIG. 8 is a detailed view of the overhead arm of the present invention.

Turning to FIG. 8, shown therein is a detailed view of the overhead arm 18 of the present invention. Shown is the overhead bar 18 comprised of an outer sleeve 60 and an extendable retractable inner member 62 having a plurality of apertures 64, therein. The outer sleeve 60 has an aperture 66 positioned on the distal end that is selectively aligned with one of the apertures 64 on the inner member 62 whereupon a provided pin 36 is inserted to fix the selected positioning of the swivel ring 40 located at the distal end of the inner member. The swivel ring 40 provides a point of attachment for the animal's leash 38 using a snap hook 68 and relative position of the animal on the treadmill.

Figure 9:
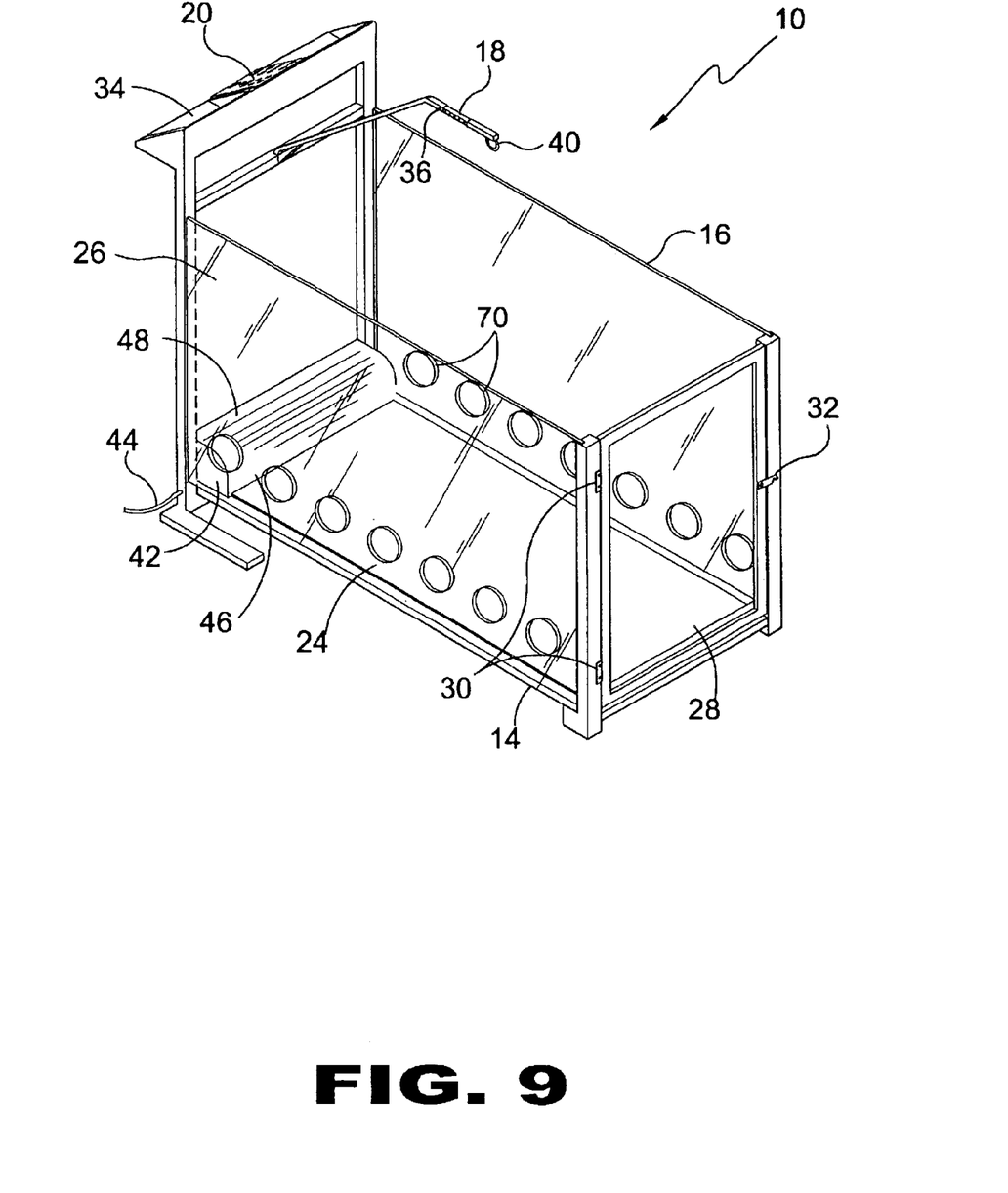
FIG. 9 is a perspective view of the dog treadmill of the present invention.

Turning to FIG. 9, shown therein is a perspective view of the dog treadmill of the present invention 10. Shown is the present invention 10 being a treadmill 24 apparatus for use in exercising a dog having a frame member 14 with a pair of side members 16 or enclosures having a plurality of apertures 70 therein and extending therebetween, an open front member 26 an entrance area having a door 28 hingedly 30 attached to the frame member with a latch 32 to secure the door in a closed position. An adjustable overhead arm 18 provides an attachment ring 40 as part of the apparatus for use in positioning the dog at a desired location on the treadmill 24. The dog is suited with a harness and attached by a leash to the overhead arm 18 prior to the activation of the apparatus. Other previously disclosed elements are also shown.

I claim:

1. Apparatus for exercising an animal, comprising:
   a) a treadmill whereby a moving belt is provided for exercising an animal thereon;
   b) an enclosure disposed around the perimeter of said treadmill, said enclosure having a frame, said frame having a pair of opposing side walls, an open front member and a rear end, said rear end having an entrance onto said treadmill;
   c) an overhead arm extending from said open front member to permit the animal to be leased to the enclosure, said overhead arm having a first and second end, wherein said second end is attached to said open front member and extends out to a free first end;
   d) said overhead arm comprising an outer sleeve and an extendable retractable inner member having a plurality of apertures therein, said outer sleeve having an aperture that is selectively aligned with one of said apertures in said inner member, and a pin insertable into said outer sleeve aperture and a selectively aligned aperture in said inner member thereby positioning the free first end of said overhead arm over said treadmill;
   e) a swivel ring attached to said free first end of said overhead arm; and
   f) one end of a leash attached to said swivel ring for positioning an animal on said treadmill.

2. The treadmill of claim 1, wherein said treadmill comprises a treadmill having a moving belt thereon, said belt providing a surface upon which the animal can exercise.

3. The treadmill of claim 2, wherein said treadmill comprises:
   a) a motor for driving said belt of said treadmill, said belt having first front and second rear opposing ends;
   b) a pulley mounted on each end of said belt to permit said belt to travel on said front and rear pulley;
   c) a bearing disposed in each pulley to permit said front and rear pulley to rotate on said bearing; and,
   d) wherein said motor is connected to said front pulley so as to drive said front pulley to permit the belt to travel on the front and rear pulley.

4. The treadmill of claim 3, further comprising a cover being disposed on said motor and said front pulley.

5. The treadmill of claim 4, wherein said motor is an electrical motor.

6. The treadmill of claim 5, wherein said motor operates on 110–120 volt alternating current.

7. The treadmill of claim 6, further comprising a control panel and a computer mounted on said front member above said overhead arm for controlling an exercise routine for the animal, said control panel having storage spaces on opposite sides of said control panel, wherein said computer is programmable for controlling an exercise routine for the animal.

8. The treadmill of claim 7, further comprising a door being disposed on said entrance, said door being hinged, said door having a latch disposed thereon to permit the door to be latched to enclose the animal in said enclosure.

9. The treadmill of claim 8, wherein each of said side walls has a plurality of apertures therein, wherein said apertures allow said enclosure to be ventilated to permit the animal to be cooled.

* * * * *